(12) United States Patent
Rohatgi et al.

(10) Patent No.: US 9,089,831 B2
(45) Date of Patent: Jul. 28, 2015

(54) SYSTEM AND METHOD FOR BLENDING POLYMERS

(75) Inventors: Vivek Rohatgi, Owasso, OK (US);
Ashish M. Sukhadia, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 589 days.

(21) Appl. No.: 13/281,049

(22) Filed: Oct. 25, 2011

(65) Prior Publication Data

US 2013/0099424 A1 Apr. 25, 2013

(51) Int. Cl.
*B01J 19/00* (2006.01)
*B29B 7/48* (2006.01)
(Continued)

(52) U.S. Cl.
CPC .................. *B01J 19/20* (2013.01); *B29B 7/426* (2013.01); *B29B 7/465* (2013.01); *B29B 7/482* (2013.01); *B29B 7/487* (2013.01); *B29B 7/489* (2013.01); *B29B 9/065* (2013.01); *B29B 9/16* (2013.01); *B29C 47/0004* (2013.01); *B29C 47/0014* (2013.01); *B29C 47/0016* (2013.01); *B29C 47/0023* (2013.01); *B29C 47/0026* (2013.01); *B29C 47/6031* (2013.01); *B29C 47/6037* (2013.01); *B29C 47/6056* (2013.01); *B29C 47/6068* (2013.01); *B29C 47/6087* (2013.01); *C08J 3/246* (2013.01); *B01J 2219/0004* (2013.01); *B29B 7/421* (2013.01); *B29B 7/429* (2013.01); *B29C 47/0011* (2013.01); *B29C 47/402* (2013.01); *B29C 47/6025* (2013.01); *B29C 2793/0009* (2013.01);

(Continued)

(58) Field of Classification Search
CPC ........ B29B 7/421; B29B 7/426; B29B 7/429; B29B 7/465; B29B 7/482; B29B 7/483; B29B 7/487; B29B 7/489; C08J 3/246
USPC ................................................ 366/81, 82, 88
See application file for complete search history.

(56) References Cited

U.S. PATENT DOCUMENTS 2,733,051 A 1/1956 Street
3,595,533 A 7/1971 Sutter
(Continued)

FOREIGN PATENT DOCUMENTS

EP 0920971 6/1999
EP 0 848 036 3/2002
(Continued)

OTHER PUBLICATIONS

International Patent Application No. PCT/US2012/060416 Searth Report. Jan. 24, 2013.

*Primary Examiner* — Jennifer A Leung
(74) *Attorney, Agent, or Firm* — Fletcher Yoder, P.C.

(57) ABSTRACT

The present techniques provide an extruder screw comprising a high shear melting and mixing zone starting a distance away from an entry point of the screw corresponding to 35%-50% of the overall screw L/D. The extruder screw may also include elements capable of increasing a degree of fill of the high shear melting and mixing zone. In accordance with present techniques, the extruder screw is configured to blend two or more polyolefin polymers having greater than about a 200,000 difference in weight-average molecular weight in a single extrusion step. The extruder screw of the present techniques may be used in a single screw or twin screw extruder, and may be incorporated into a polyolefin production plant for producing multi-modal resins.

23 Claims, 8 Drawing Sheets (51) Int. Cl.
  *B01J 19/20* (2006.01)
  *B29B 7/42* (2006.01)
  *B29B 7/46* (2006.01)
  *C08J 3/24* (2006.01)
  *B29C 47/60* (2006.01)
  *B29B 9/06* (2006.01)
  *B29B 9/16* (2006.01)
  *B29C 47/00* (2006.01)
  *B29L 31/00* (2006.01)
  *B29K 23/00* (2006.01)
  *B29C 47/40* (2006.01)

(52) U.S. Cl.
  CPC ............... *B29C 2793/009* (2013.01); *B29C 2947/92295* (2013.01); *B29C 2947/92304* (2013.01); *B29C 2947/92438* (2013.01); *B29K 2023/0658* (2013.01); *B29L 2031/7158* (2013.01)

(56) References Cited

U.S. PATENT DOCUMENTS

| | | | | |
|---|---|---|---|---|
| 4,663,103 | A | * | 5/1987 | McCullough et al. ....... 264/40.4 |
| 4,895,688 | A | * | 1/1990 | Shigetani et al. ............. 427/391 |
| 5,225,488 | A | | 7/1993 | Baird et al. |
| 5,666,199 | A | | 9/1997 | Hess et al. |
| 6,031,027 | A | * | 2/2000 | Syre et al. ..................... 523/344 |
| 6,048,088 | A | * | 4/2000 | Haring et al. ................... 366/85 |
| 6,194,526 | B1 | | 2/2001 | Benham et al. |
| 6,214,469 | B1 | | 4/2001 | Sukhadia et al. |
| 6,248,840 | B1 | | 6/2001 | Sukhadia et al. |
| 6,355,359 | B1 | | 3/2002 | Sukhadia et al. |
| 6,380,311 | B1 | * | 4/2002 | Razavi et al. ................. 525/191 |
| 6,388,017 | B1 | | 5/2002 | McDaniel et al. |
| 6,538,077 | B1 | | 3/2003 | Shveima et al. |
| 6,617,403 | B2 | | 9/2003 | Sukhadia et al. |
| 6,716,938 | B2 | | 4/2004 | Shveima et al. |
| 6,900,266 | B2 | | 5/2005 | Raty |
| 6,908,964 | B2 | | 6/2005 | Adedeji et al. |
| 7,041,617 | B2 | | 5/2006 | Jensen et al. |
| 7,094,857 | B2 | | 8/2006 | Sukhadia et al. |
| 7,119,153 | B2 | | 10/2006 | Jensen et al. |
| 7,148,298 | B2 | | 12/2006 | Jensen et al. |
| 7,199,073 | B2 | | 4/2007 | Martin et al. |
| 7,270,876 | B2 | | 9/2007 | Bednarik et al. |
| 7,420,010 | B2 | | 9/2008 | Sukhadia et al. |
| 7,456,243 | B2 | | 11/2008 | Jensen et al. |
| 7,470,758 | B2 | | 12/2008 | Jensen et al. |
| 7,507,473 | B2 | | 3/2009 | Bednarik et al. |
| 7,572,875 | B2 | | 8/2009 | Jensen et al. |
| 7,632,907 | B2 | | 12/2009 | Sukhadia et al. |
| 2002/0028891 | A1 | | 3/2002 | Sukhadia et al. |
| 2003/0008980 | A1 | * | 1/2003 | Mawson et al. ................. 526/61 |
| 2003/0021915 | A1 | | 1/2003 | Rohatgi et al. |
| 2003/0171510 | A1 | | 9/2003 | Shveima et al. |
| 2004/0052987 | A1 | | 3/2004 | Shetty et al. |
| 2004/0087745 | A1 | | 5/2004 | Sukhadia et al. |
| 2004/0156957 | A1 | | 8/2004 | Kulkarni et al. |
| 2004/0161601 | A1 | | 8/2004 | Bednarik et al. |
| 2004/0249083 | A1 | * | 12/2004 | Maziers ........................ 525/240 |
| 2005/0127559 | A1 | * | 6/2005 | Eggen et al. ............. 264/211.21 |
| 2005/0137342 | A1 | | 6/2005 | Krishnaswamy et al. |
| 2005/0153830 | A1 | | 7/2005 | Jensen et al. |
| 2005/0159300 | A1 | | 7/2005 | Jensen et al. |
| 2005/0203261 | A1 | | 9/2005 | Sukhadia et al. |
| 2005/0203265 | A1 | | 9/2005 | Sukhadia et al. |
| 2005/0288461 | A1 | | 12/2005 | Jensen et al. |
| 2005/0288462 | A1 | | 12/2005 | Jensen et al. |
| 2006/0025546 | A1 | | 2/2006 | Jensen et al. |
| 2006/0100401 | A1 | | 5/2006 | Martin et al. |
| 2006/0229420 | A1 | | 10/2006 | Jensen et al. |
| 2006/0245294 | A1 | | 11/2006 | Burkhardt |
| 2007/0100047 | A1 | | 5/2007 | Sukhadia et al. |
| 2007/0287814 | A1 | | 12/2007 | Jensen et al. |
| 2008/0004411 | A1 | | 1/2008 | Sukhadia et al. |
| 2008/0145653 | A1 | | 6/2008 | Bednarik et al. |
| 2008/0145654 | A1 | | 6/2008 | Bednarik et al. |
| 2008/0281063 | A9 | | 11/2008 | Sukhadia et al. |
| 2009/0054606 | A1 | | 2/2009 | Jensen et al. |
| 2010/0048843 | A1 | | 2/2010 | Jensen et al. |

FOREIGN PATENT DOCUMENTS

| | | |
|---|---|---|
| EP | 2192150 | 6/2010 |
| GB | 2140314 | 11/1984 |
| WO | WO 02/102562 | 12/2002 |
| WO | WO03/047839 | 6/2003 |
| WO | WO2011/064651 | 6/2011 |

* cited by examiner

SYSTEM AND METHOD FOR BLENDING POLYMERS

BACKGROUND OF THE INVENTION

1. Field of the Invention

The present techniques relate generally to extrusion blending of polyolefin polymers. More particularly, the present techniques relate to new blending screw configurations for extruders making such blends.

2. Description of the Related Art

This section is intended to introduce the reader to aspects of art that may be related to aspects of the present techniques, which are described and/or claimed below. This discussion is believed to be helpful in providing the reader with background information to facilitate a better understanding of the various aspects of the present techniques. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains or polymers have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging, household containers, household items, automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application (e.g., tensile strength, impact strength, modulus, and hardness), the physical requirements (e.g., thermal stability, molecular weight, and density), and the phase behavior (e.g., glass transition temperature, melt and melt crystallization temperatures) typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed at or near petrochemical facilities, which have ready access to the short-chain olefin molecules (monomers and comonomers) such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product including polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, residence time, polymer production rate, and so forth, may be selected to achieve the desired fluff properties. While this discussion illustrates a wide range of characteristics that may be tailored to obtain desired properties for specific applications, there is an ongoing need to develop techniques to produce polyolefins with useful properties.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Overview

Useful properties may be obtained by blending polyolefins having different characteristics. For example, blending one or more polymers having a low molecular-weight (Mw) with one or more polymers having a high Mw may provide a polymer having high strength, high chemical resistance, and good processability on current equipment. Such polymer blends, termed multi-modal resins, may be useful in the manufacture of long-lasting, pressure pipe and stronger films, among others. However, making such multi-modal resins may be problematic, as many production techniques either fail to adequately blend polyolefins having different molecular weights or may degrade a high Mw polymer, for example. Moreover, the use of small mesh size screens to reduce the number and size of defects limit production rates due to high screen pack pressure differential. In an effort to mitigate these problems, techniques for making such blends may include the use of two or more twin screw blending extruders in series or special polymer melt mixers. However, the use of two or more extruders or special mixers may add substantial costs to the production of these special polyolefin blends.

In response, the present techniques employ extruder mixing screws having an early high shear melting and mixing section along with elements (e.g., left hand backward conveying elements or kneading blocks) to increase the degree of fill early (as opposed to close to the metering section) in the extrusion process. As discussed below, a melting and mixing section may be located such that it begins after the feed zone at a location corresponding to 35%-50% of the overall screw length/diameter (L/D) in a direction away from the entry point of the screw in accordance with present embodiments. For example, if the screw length is 4,230 mm and the screw diameter is 300 mm, then the L/D is 14.1 and the melting and mixing section may begin from 1,480.5 mm (35%) to 2,115 mm (50%) along the length of the screw in a direction away from the feed zone. In other words, according to such an example, the melting and mixing section may begin at a point along the length of the screw that is 1,480.5 mm away from the entry point of the screw, at a point 2,115 mm away from the entry point of the screw, or any point in between. The location of the melting and mixing section may be identified by calculating 35%-50% of the L/D and then identifying the corresponding section of the screw based on the diameter of the screw. Locating an early high shear melting and mixing section starting at a distance corresponding to 35%-50% of the overall screw L/D away from the feed zone may allow for the efficient melting and mixing or dispersion of low Mw polymers and high Mw polymers in a single extrusion step. Further, this may be achieved without the use of two extruders or a special mixer and without forming significant defects in the extruded pellets and the end-use articles. The high and low Mw polymers may be obtained as a reactor mixture or a physical mixture. For example, a bimodal mixture may result from a reactor mixture, wherein polymer is produced under a first set of conditions in a first reactor and then transferred to a second reactor under a second set of conditions, thus, producing a bimodal polymer mixture. A physical mixture may be obtained, for example, by blending two or more separate polymer products in a Banbury mixer, by feeding them in separate streams to an extruder without an initial mixing step, by producing the components in parallel reactors and combining them somewhere downstream of the reactors, by producing the components in a reactor and combining in a blend or mixing vessel or tank, or some other technique commonly known in the art. Also, a mixture of polymers may be produced by feeding more than one catalyst type or a single catalyst with multiple catalyst components to a single reactor. These catalyst types could produce high and low molecular weight components. The polymer components could be intimate mixtures. For example, a bimodal product could be produced in series reactors where reactor conditions are targeted to produce two different average molecular weight components. In this case the polymerization reactor continues from the first reactor and thus produces an intimate mixture where the components could not be separated.

The extruder screws of the present techniques may be assembled by mounting individual screw elements onto a central shaft. The screws may be used in extruders in stand alone applications, such as where an extruder may be used to form a polyolefin blend from two separate feed resins. Alternatively, the extruder screws may be incorporated into extruders in either existing or new polyolefin plant designs for the production of multi-modal resins directly from reactor effluent streams containing multiple polymers.

Multi-Modal Resins

Present embodiments may blend two or more polyolefin polymers having a substantial difference in weight-average molecular weight, such as a difference of 200,000 or greater. This may result in a multi-modal polymer having less than about 90 defects/ft2 in a size range of about 250 to about 800 microns, the multi-modal polymer having a density in the range of 0.942 g/cc-0.958 g/cc or 0.945 g/cc-0.955 g/cc and a pellet High Load Melt Index or HLMI (as described by ASTM Method D-1238) in a range of 4 g/10 min to 18 g/10 min, 6 g/10 min-16 g/10 min, or 7 g/10 min-11 g/10 min. An example of two polyolefin polymers of different Mw that may be combined to form a multi-modal resin may be represented by the Mw distribution plot 10 shown in FIG. 1. A multi-modal resin may include at least a low Mw polyolefin 12 to improve processability and a high Mw polyolefin 14 to improve the toughness and chemical resistance.

In this example, the low Mw polyolefin 12 may include a polyolefin polymer or copolymer having a Mw between about 15,000 g/mol and 100,000 g/mol weight-average molecular weight, or between about 20,000 g/mol and 60,000 g/mol. For example, the low Mw polyolefin 12, shown in FIG. 1, has a weight-average Mw of about 39,000 g/mol.

Figure 1:
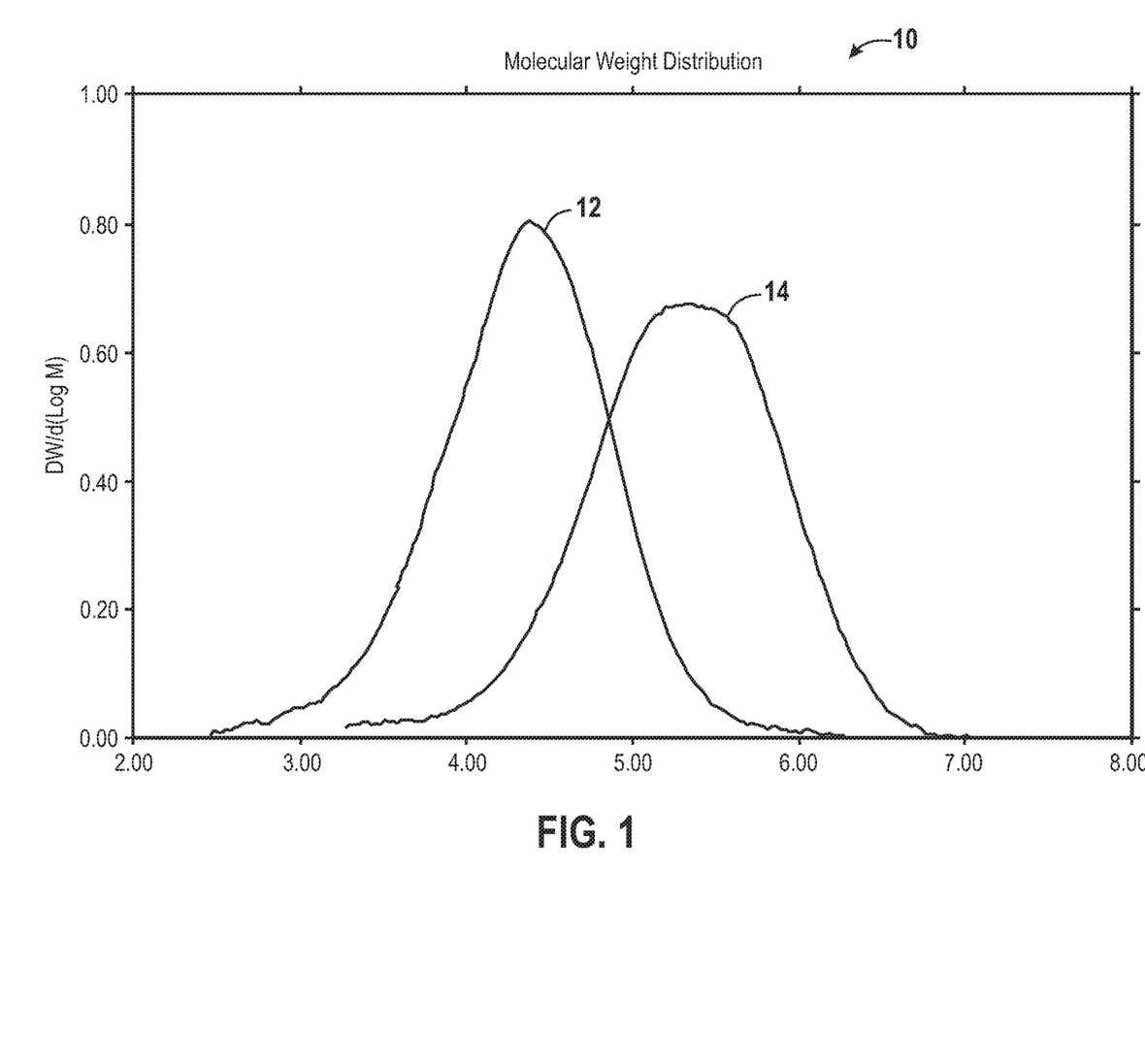
FIG. 1 is a graph of molecular weight curves for two polyolefins that may be blended using embodiments of the present techniques.

The low Mw polyolefin 12 may be present in the multi-modal resin in an amount between about 10% and 60%, by weight, or in an amount between about 30% and 55%, by weight. The amount of low Mw resin in the blend may be determined by the final properties desired. If too high an amount of low Mw resin is incorporated in the multi-modal resin, the final properties may not be sufficient for many applications. However, if too low an amount is included, the multi-modal resin may not be able to be processed in many types of equipment.

The high Mw polyolefin 14 may include a polyolefin polymer or copolymer having a Mw between about 200,000 g/mol and 700,000 weight-average molecular weight, or between about 350,000 g/mol and 600,000 g/mol weight-average Mw. For example, the high Mw polyolefin 14 illustrated in FIG. 1 has a weight-average Mw of about 425,000 g/mol.

The high Mw polyolefin 14 may be present in the multi-modal resin in an amount between about 40% and 90%, by weight, or in an amount between about 45% and 70%, by weight. Generally, the amount of high Mw resin used depends on the final properties desired. The high Mw resin should be present in sufficient amount to provide beneficial properties, but may interfere with processing if present in too great an amount.

Other materials or additives may be included in a multi-modal resin, including polyolefins having intermediate molecular weights, pigments, stabilizers, fillers, and the like. The use of these components generally depends on the final properties desired. For example, a pipe application may use a yellow pigment and increased amounts of stabilizer, depending on the needed lifespan, and so on. Other applications may use other combinations of additives to achieve desired properties.

Extrusion Blending Screw

Figure 2:
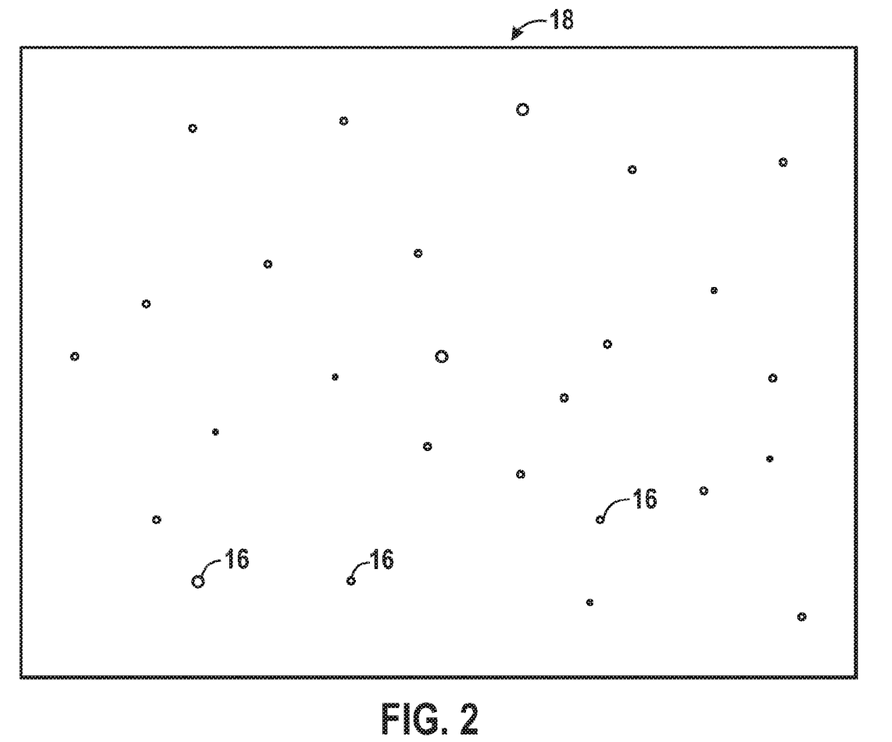
FIG. 2 is an illustration of a polymer film or sheet showing spots corresponding to defects that may be caused by improper blending of the polymer components.

Although the multi-modal resin may have advantageous properties over mono-modal resins, the blending of polyolefins having different molecular weights may result in numerous defects 16 in final products, as illustrated in FIG. 2. FIG. 2 is an illustration of a blown film 18 used for counting the number of defects 16 present. Common blending screw configurations used in a single train twin-screw extruder unit may fail to homogeneously disperse a portion of the high Mw polyolefin 14, resulting in defects 16 formed from the undispersed resin. Further, if the extrusion conditions are made more aggressive to homogeneously disperse the high Mw resin 14, the result may, unfortunately, be degradation of the resin 14, leading to a loss of high Mw polymer, and thus performance or strength properties, and in the extreme, furthermore forming defects 16 made up of crosslinked resin, termed gels.

Figure 3:
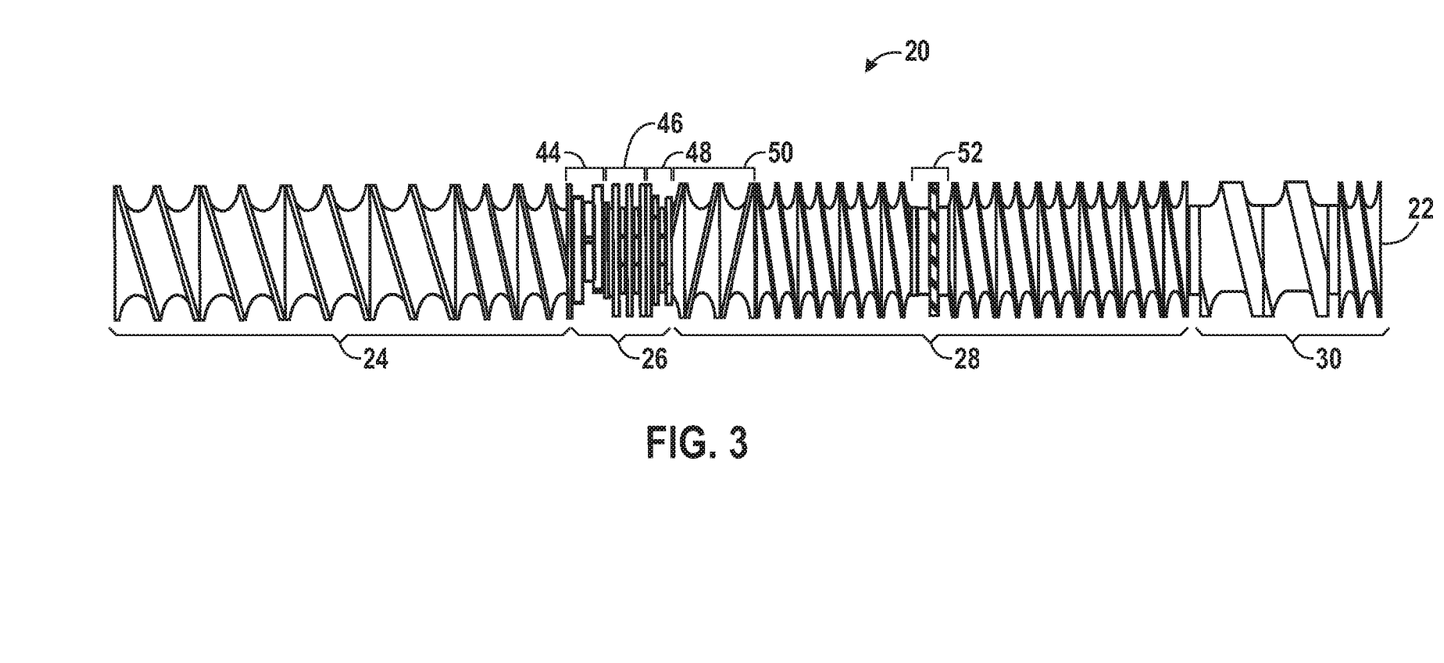
FIG. 3 is a side view of a screw that may be useful for blending polyolefins, in accordance with embodiments of the present techniques.

Surprisingly, a new screw configuration has been developed that may be used to process multi-modal resins in a single twin-screw extruder unit. A diagrammatical representation of an embodiment of this screw configuration 20 is shown in FIG. 3. As shown in FIG. 3, the screw 22 has a feed zone 24 beginning at an entry point of the screw 22, followed by a high shear melting zone 26. A mixing zone 28 may be located after the high shear melting zone 26, before a final metering zone 30. Generally, the inclusion of an early high shear melting zone 26 after the feed zone 24, providing a long melt wetted length (i.e., the length of the screw that is filled with the polymer melt), may be expected to increase defects 16 in resin blends. However, as discussed with respect to the examples below, the location of the high shear melting zone 26 substantially adjacent to the feed zone 24 actually lowered the total number of defects 16 when compared to other blending screw configurations.

Figure 4:
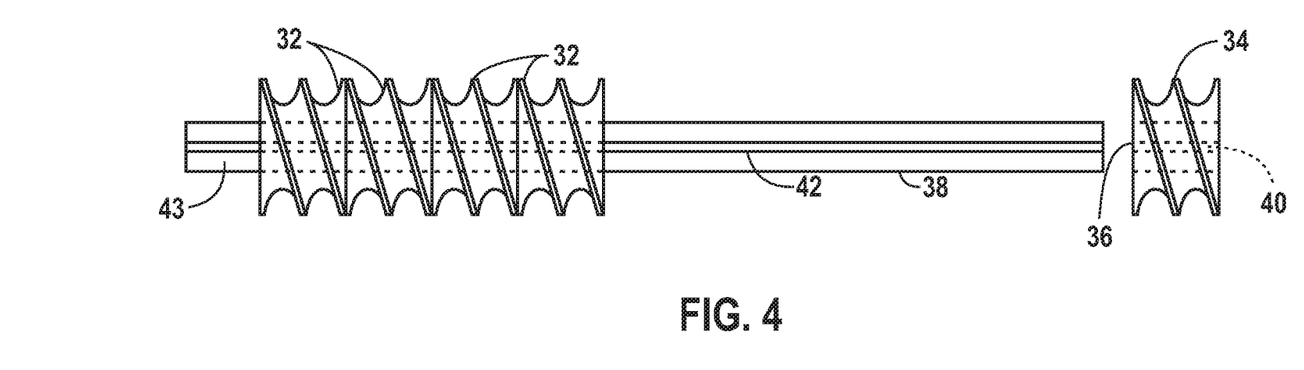
FIG. 4 is an exploded view showing assembly of the screw of FIG. 1 onto a central shaft, in accordance with embodiments of the present techniques.

The screw configurations 20 of the present technique are assembled from individual elements 32 placed on a central shaft 38, as shown in the exploded view of FIG. 4. In this figure, free screw elements 34 having an open center 36 are slid onto the central shaft 38. Each free screw element 34 has an alignment notch 40 which aligns with an alignment key 42 on the central shaft 38. The alignment key 42 aligns the elements 32 and provides motive force, so that the elements 32 turn in unison with the shaft 38. The shaft 38 is driven by a gear 43 formed into the back of the shaft 38. The elements 32 may include elements for conveying polymers, moderate and high shear elements for melting polymers, or moderate and high shear elements for mixing polymers, among others. One system in which individual screw elements 32 are assembled onto a central shaft 38, may be available from Coperion Werner & Pfleiderer, Inc. of Stuttgart, Germany, as part of the ZSK line of extruders and screw elements. One of ordinary skill in the art will recognize that similar systems that may be available from other suppliers may also be used in the present techniques.

Referring again to FIG. 3, the high shear zone 26 of the blending screw 22 of the present techniques may be assembled from any number of different elements 32 that provide high shear. For example, in the embodiment illustrated, the first element 32 after the feed zone 24 is a three-lobe kneading block 44, followed by a neutral kneading block 46, a two-lobe right hand kneading block 48, and two left hand backward conveying elements 50. One of ordinary skill in the art will recognize that other configurations may be used to provide similar effect. The mixing zone 28 of the embodiment shown has another element known as a turbine mixing element 52. While this element may be useful to improve the overall mixing or in the incorporation of various additives, other combinations of elements may be used to achieve similar effects as will be obvious to one skilled in the art.

Figure 5:
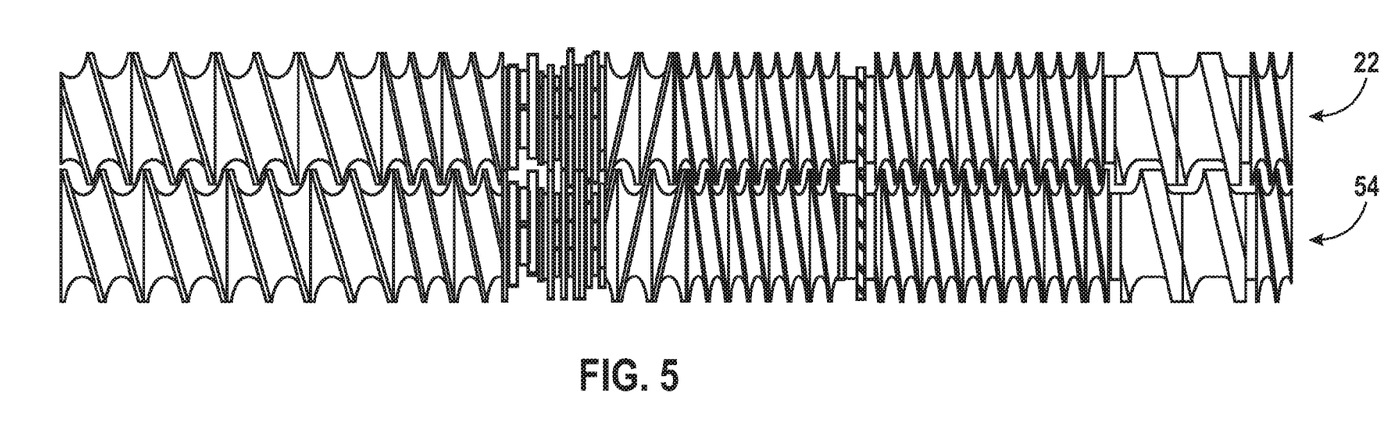
FIG. 5 is a top view of two intermeshing blending screws for use in a co-rotating twin screw extruder in accordance with embodiments of the present techniques.

The mixing screw 22 of the present techniques may be used in a twin screw configuration, in which the screw 22 may be used with a second screw 54 containing substantially identical elements, as shown in the top view of FIG. 5. The two screws 22 and 54 are intermeshed and turn in the same direction, i.e., the screws are co-rotating. Twin screw extruders may be more efficient at mixing at desired production rates than single screw extruders and are typically used for compounding applications.

An example of a twin screw extruder 56, which may use the intermeshing, co-rotating screws 22 and 54 described above, is shown in perspective view in FIG. 6. An open bore 58 allows the two intermeshed screws 22 and 54 to be slid into the extruder 56, with the gear 43 on the end of each shaft 38 (See FIG. 4) inserted first. The gear 43 engages gears located within a motor unit 60 located at the back of the extruder 56. After the screws 22 and 54 are inserted, a throttle valve (not shown), gear pump (not shown), screen changer (not shown), a die plate (not shown) or pelletizer (not shown) may be installed in the front of the extruder 56 for the production of pellets. Connections 62 on the sides of each section 64 of the extruder 56 allow fluids to be pumped through for temperature control, e.g., heating and/or cooling. Other connections 66 may be made to vacuum units (not shown) for devolatilization of the polymers or for adding materials to the polymer melt. The polymers are fed into the feed zones 24 of the extruder screws 22 and 54 in the extruder 56 through a feedthroat 68.

Figure 6:
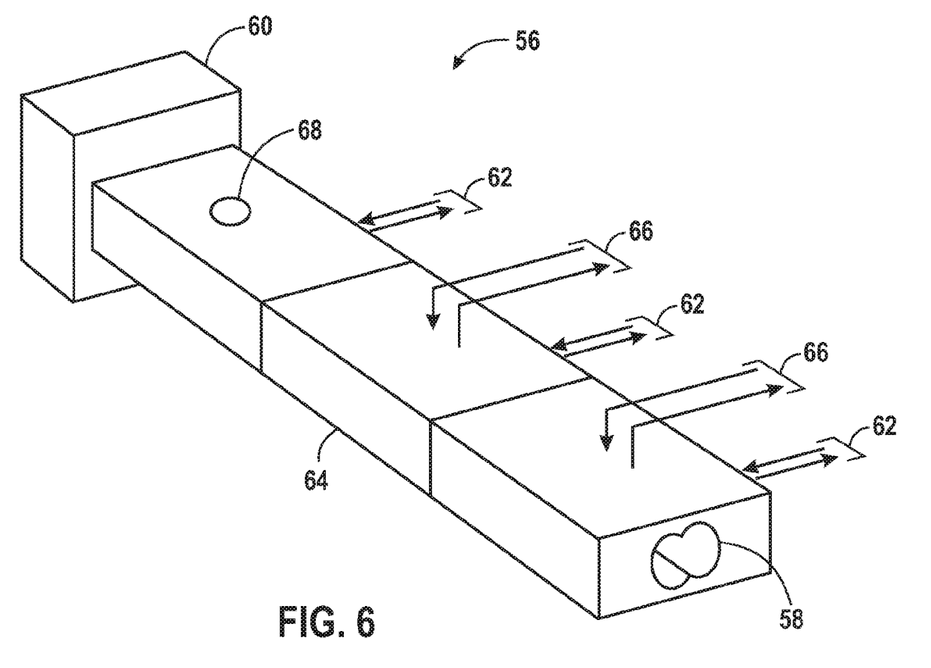
FIG. 6 is a perspective view of a twin screw extruder that may use the two blending screws of FIG. 5, in accordance with an embodiment of the present techniques.

The extruder 56 may be used in stand-alone blending facilities for producing multi-modal resins from powder, fluff, or other sources of resins having different molecular weights. In this type of facility, multiple blending lines may be run in parallel for increased production rates. Alternatively, the extruder 56 may be connected to other units to be used in a polyolefin production process, as discussed below.

Polyolefin Production Process

The melting and mixing screw 22 of the present techniques may be used as part of a larger process to produce multi-modal resins on a commercial scale. For example, a manufacturing process 68 for producing polyolefins, such as polyethylene homopolymer, polypropylene homopolymer, and/or their copolymers, is depicted in the block diagram in FIG. 7.

Figure 7:
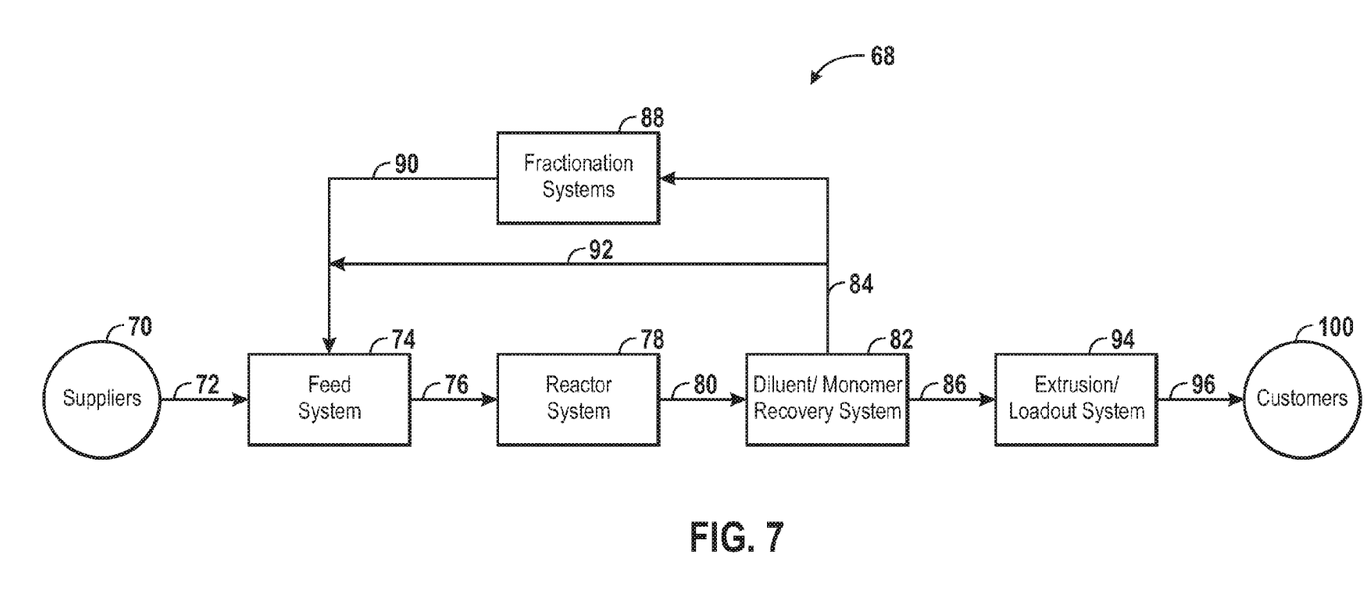
FIG. 7 is a block diagram of an exemplary polyolefin production process, in accordance with embodiments of the present techniques.

As shown in FIG. 7, various suppliers 70 may provide reactor feedstocks 72 to the manufacturing system 68 via pipelines, trucks, cylinders, drums, and so forth. The suppliers 70 may include off-site and/or on-site facilities, such as, for example, olefin plants, refineries, catalyst plants, and the like. Examples of possible feedstocks 72 include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives.

The feedstocks 72 are provided to a feed system 74, where they may be stored, such as in monomer storage and feed tanks, diluent vessels, catalyst tanks, co-catalyst cylinders and tanks, and so forth. In the feed system 74 the feedstocks 72 may be treated or processed prior to their introduction as feed 76 to the reactor system 78. For example, feedstocks 72, such as monomer, comonomer, and diluent, may be sent through treatment beds (e.g., molecular sieve beds, aluminum packing, etc.) to remove catalyst poisons. For example, these catalyst poisons may include water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 72 is utilized, with a majority of the diluent fed to reactor system 78 recovered from the reactor effluent.

The multi-modal resins of the present techniques may be made using a reactor system 78 that includes a polymerization reactor vessel, such as a liquid-phase or a gas-phase reactor. In some schemes used for making multi-modal resins, multiple reactors may be used. In these schemes, the reactor system 78 may include combinations of liquid and gas-phase reactors, as well as combinations of multiple liquid or multiple gas phase reactors. If multiple reactors make up the reactor system 78, the reactors may be arranged in series, in parallel, or in any other suitable combination or configuration.

In the polymerization reactor vessels, one or more olefin monomers are polymerized to form a product including polymer particulates, typically called fluff. The fluff may possess one or more melt, physical, rheological, and/or mechanical properties of interest, such as molecular weight, density, melt index (MI), melt flow rate (MFR), copolymer or comonomer content, modulus, and crystallinity. One or more catalysts that facilitate polymerization of the monomer are typically added to the polymerization reactor vessels. The catalyst or catalysts may be selected to achieve the desired fluff properties for each component polymer in the multi-modal resin. Further, the reaction conditions, such as temperature, pressure, flow rates, mechanical agitation, product takeoff, component concentrations, polymer production rate, residence time and so forth, may also be selected to achieve the desired properties.

If the reactor or reactors are liquid-phase, a diluent is typically fed into the reactor. The diluent may be an inert hydrocarbon that is a liquid at reaction conditions, such as isobutane, propane, n-pentane, i-pentane, neopentane, n-hexane, cyclohexane, cyclopentane, methylcyclopentane, ethylcyclohexane, and the like. A purpose of the diluent is generally to suspend the catalyst particles and polymer within the reactor (e.g., in the circulation of the polymer slurry in a loop reactor).

Various configurations of reactors within the reactor system 78 may be used to form multiple molecular weights. For example, a single polymerization reactor may be used to form different molecular weight resins during different operating periods. In this scheme, a polymerization reactor may be run at a relatively high hydrogen concentration, which may form a low molecular weight resin component due to chain transfer. The low molecular weight component formed may be stored in one or more silos for later use. The same polymerization reactor may then be used to produce a high molecular weight resin by operating with a lower hydrogen concentration, reducing the amount of chain transfer. The high molecular weight resin may then be fed to a blending extruder 56, using the blending screw of the present techniques, with a side stream of low molecular weight resin to form the multi-modal resin.

One of ordinary skill in the art will recognize that any number of other techniques may also be used to produce a mixture of high and low molecular weight resins for further processing in the blending extruder. For example, a reactor system 78 having a single reactor using two or more catalysts may make a blended fluff having more than one molecular weight. In another possible scheme, a reactor system 78 having two or more reactors in series may be used, in which a resin having a first molecular weight may be formed in a first reactor, then fed into a second reactor where different conditions are used to form another molecular weight. Alternatively, these reactors could be in series, with the different molecular weight resins blended during transport to the extrusion system. The reactors could be liquid or gas phase. The liquid reactors could comprise loop slurry reactors. The gas phase reactors could comprise fluidized bed reactors. Combinations of liquid and gas phase reactors could be used.

The discharge 80 of the reactors within the reactor system 78 may include the polymer fluff as well as non-polymer components, such as diluent, unreacted monomer/comonomer, and residual catalyst. The discharge 80 may be subsequently processed, such as by a diluent/monomer recovery system 82, to separate non-polymer components 84 (e.g., diluent and unreacted monomer) from the polymer fluff 86. The diluent/monomer recovery system 82 may have a low-pressure recovery flash of the diluent/monomer with an associated recycle compression or may eliminate this process step using only a high pressure flash.

With or without the low pressure flash, the untreated recovered non-polymer components 84 may be further processed, such as by a fractionation system 88, to remove undesirable heavy and light components. Fractionated product streams 90 may then be returned to the reactor system 78 via the feed system 74. Alternatively, the non-polymer components 84 may recycle more directly to the feed system 74 (as indicated by reference numeral 92), bypassing the fractionation system 88, and thus avoiding the energy consumption of the fractionation system 88. Indeed, in certain embodiments, up to 80-95% by weight of the diluent discharged from the reactor bypasses the fractionation system 88 in route to the reactor system 78.

As discussed in more detail below, in the extrusion/loadout systems 94, the fluff 86 is typically extruded to produce polymer pellets 96 with the desired mechanical, physical, and melt characteristics. In general, the polyolefin pellets may then be transported to a product load-out area where the pellets may be stored, blended with other pellets, and/or loaded into railcars, trucks, bags, and so forth, for distribution to customers 100.

Extrusion/Loadout System

Figure 8:
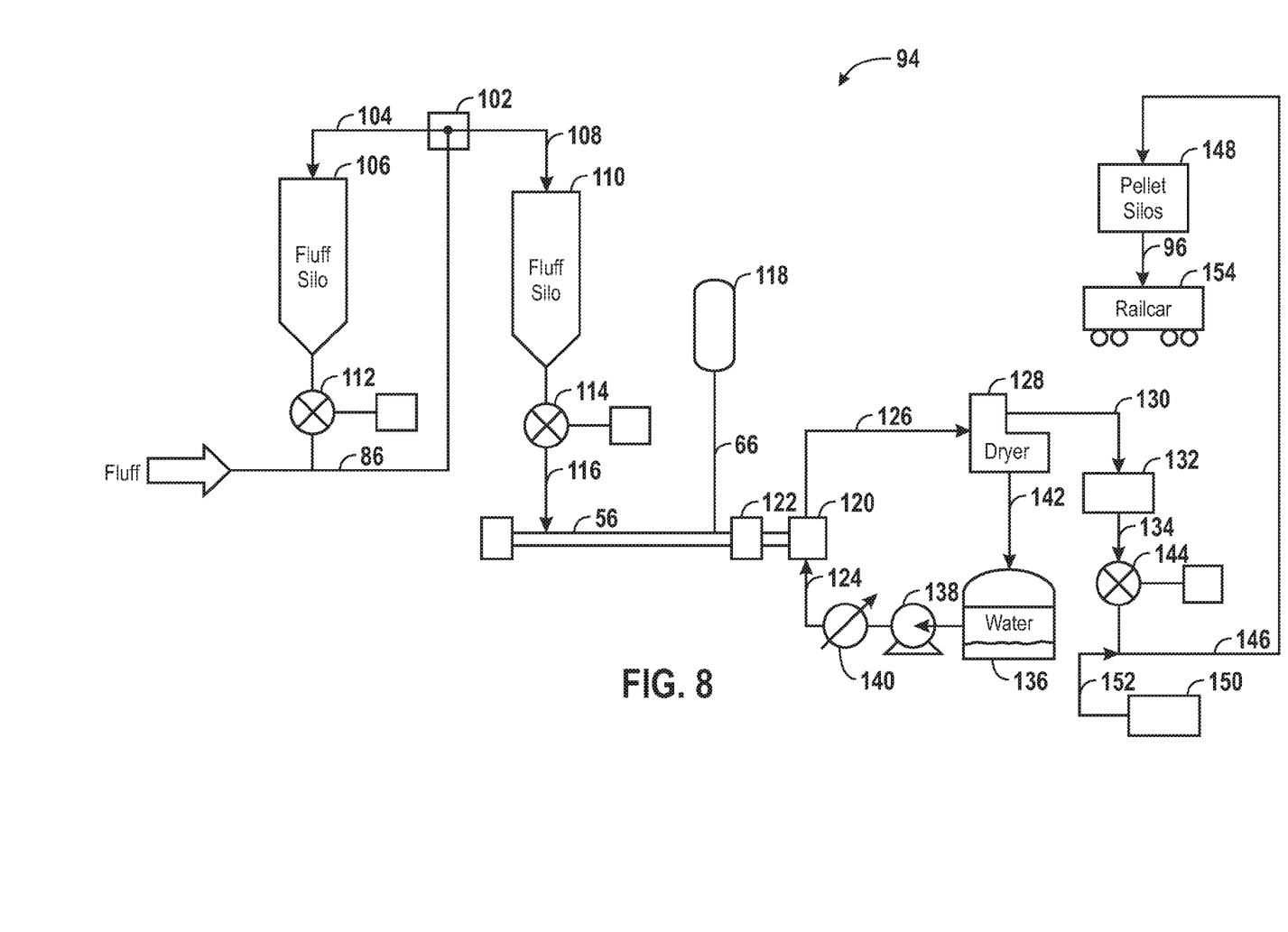
FIG. 8 is a process flow diagram of the extrusion/loadout system of FIG. 7 in accordance with embodiments of the present techniques.

A process flow diagram of the extrusion/loadout system 94 of FIG. 7 is depicted in FIG. 8. Polyolefin fluff 86 may be pneumatically transferred, for example, using a dilute phase blower, through a valve 102 in the extruder/loadout system 94, and either into a conduit 104 to a fluff silo 106, or into a conduit 108 to an extruder feed tank 110. The fluff silo 106 may be used to provide surge capacity in the extrusion/loadout system 94 during various operations, such as a shutdown of the extruder, among others. On the other hand, the fluff silo 106 may also accumulate fluff to allow for full-rate operation of the extruder while the upstream reactor system 78 "catches up" during start up of the polymerization reactors. The polyolefin fluff in silo 106 may be pneumatically transferred to the extruder feed tank 110 through rotary valve 112 with the aid of a blower system (not shown).

Typically, however, the primary flow of polyolefin fluff 86 is to the extruder feed tank 110 via conduit 108. Downstream, rotary valve 114 may feed polyolefin fluff 116 to the extruder 56 which, in an embodiment, may the twin screw blending extruder 56 discussed with respect to FIG. 6. As will be appreciated by one of ordinary skill in the art, the fluff 116 from the extruder feed tank 110 may be metered to the extruder 56 with a variety of meters, such as smart flowmeter-type, master-feeder type, and so forth. As discussed above, the fluff silo 106 may be used to store polyolefin having a particular molecular weight for later use in forming a multi-modal resin.

Extruder feed may include process stabilizers and additives, such as UV inhibitors, phenolics, phosphites, process aids, and peroxides, among others, which are added to the fluff 116 to impart desired characteristics to the polymer pellets 96. Furthermore, the additives may be injected into the fluff 116 stream at an addition rate which may be based on a specified ratio to the mass flow rate of the fluff 116. This ratio or "slave" feed of additives to fluff 116 may be specified at a value to generate a desired recipe, for example, for each polyolefin grade or product, and to give the desired properties of the downstream polyolefin pellets. Furthermore, the additive addition may be accomplished with a liquid additive system, loss-in-weight-feeders, and the like. For example, one or more loss-in-weight feeders may be used to meter a pre-mixed additive package fed from a bulk container (not shown) to the extruder 56 via the fluff 116, or directly to the extruder 56 from an extruder feed hopper 118 through a connection 66 on the extruder 56, and so on.

An extruder receives the feed, including the fluff 116 and whatever additives have been added. In general, the extruder 56 may melt, blend, homogenize, and pump the polyolefin polymer and additives through a pelletizer 120, which may include a screen pack and heated die head 122. The pelletizer 120 has pelletizer knife blades (i.e., under water) which may cut the polyolefin melt extruded through the die into pellets. The pellets are typically quenched by water 124 and may travel in a pellet-water slurry 126 from the pelletizer 120 to a pellet dewatering dryer 128. The dryer 128 may separate the free water and then dry the remaining surface water from the pellets by centrifugal force. The dried pellets 130 may discharge, for example, onto a scalping screen 132 which removes oversized and undersized pellets from on-specification pellets 134.

Water 124 may be supplied to the pelletizer 120 from a water tank 136 via a centrifugal pump 138 and cooler 140, for example, a shell and tube heat exchanger. Water 142 removed from the pellet dryer 128 may return to the water tank 136. The polyolefin pellets 134 exiting the scalping screen 132 may fall by gravity through a rotary valve 144 into, for example, a dense-phase pneumatic conveying line 146 for transport to pellet silos 148.

The pellet silos 148 may include storage tanks, blenders, off-specification storage tanks, and so on. In the illustrated embodiment, the blower package 150 provides nitrogen and/or air 152 to convey the pellets 134 via conveying line 146 to the pellet silos 148. Polyolefin pellets 96 may be loaded into rail cars 154, hopper cars, trucks, tote bins, bags, and so on. Pellets 96 may be loaded into rail cars 154, for example, using a gravity type, air assisted, multiple-spout, loading system. Such a system may allow the rail cars 154 to be automatically loaded at a rate higher than the polymerization and extrusion production rate. Thus, extra "time" generated by the higher loadout rates may be exploited to provide time to move the rail cars 154 after filling, and to spot the next empty rail car 154.

In the case of polyethylene, pellets 96 shipped to customers 100 (See FIG. 7) may include low density polyethylene (LDPE), linear low density polyethylene (LLDPE), medium density polyethylene (MDPE), high density polyethylene (HDPE), and enhanced polyethylene. Further, the pellets 96 may include blends of these resins, such as the multi-modal resins of the present techniques. The various types and grades of polyethylene pellets 96 may be marketed, for example, under the brand names Marlex® polyethylene or MarFlex™ polyethylene of Chevron Phillips Chemical Company LP, of The Woodlands, Tex., USA.

Polyolefin Products Made from Pellets

The polyolefin (e.g., polyethylene) pellets 96 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, drums, gas and water pipes, safety equipment, coatings, toys and an array of containers and plastic products.

Ultimately, the products and components formed from polyolefin (e.g., polyethylene) pellets 96 may be further processed and assembled for distribution and sale to the consumer. For example, film packaging may be wrapped around a pallet for shipment to a consumer or a pipe line may be assembled and buried for natural gas distribution and sale.

To form end-products or components from the pellets 96, the pellets are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Profile extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, and well casings, to name a few applications. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Resins such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material may be welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding may be used in conjunction with monolayer and/or multilayer coextrusion technologies for producing numerous products, such as labeled bottles. Advantageous properties of the products produced by the blown film process may include clarity, tear strength, optical properties, and toughness, to name a few.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

Using either type of film extrusion, multi-modal resins of the present techniques, for example, may be extruded and used in an assortment of applications due to its flexibility, chemical resistance, durability, processability, cost advantages, and the like. Such applications may include stretch films for palletizing materials, packaging for fresh cut fruits and vegetables, shrink wrap, and other product packaging. Films made from the multi-modal resins may also be useful in unusual applications for which processability, toughness, and chemical resistance are advantageous, for example, geomembranes. A geomembrane may be used to isolate a storage pit, such as for a dump or sewer overflow pit, from the surrounding ground, protecting groundwater from contamination. Other applications may include garment bags, bakery films, industrial liners, and the like.

EXAMPLES

The efficacy of an embodiment of the extruder screw 22 of the present techniques in generating lower defects 16 than alternate blending screws was tested. The test was performed by comparing the number of defects in films made from multi-modal resins using the screw configuration 20 in accordance with present embodiments, as discussed with respect to FIG. 3, with those from identical resins processed using a standard blending screw. The standard blending screw configuration used for the present examples has a long solids conveying section and a short melting and mixing section comprised of three, two-lobe right handed kneading block elements close to the metering section of the screw. The conditions used for the tests and results obtained from the tests are shown in Table 1.

TABLE 1

Defect counts for resins using standard and new screw configurations.

| Run | High Mw Resin (%) | Low Mw Resin (%) | Rate (lb/hr) | Screw Speed (rpm) | Defects/ft$^2$ (250-800 microns) |
|---|---|---|---|---|---|
| Standard Screw | | | | | |
| 1-A | 54 | 46 | 289 | 200 | 30 |
| 2-B | 46 | 54 | 293 | 200 | 70 |
| 3-C | | | 211 | 275 | 147 |
| New Screw 22 | | | | | |
| 4-A | 54 | 46 | 296 | 200 | 21 |
| 5-B | 46 | 54 | 282 | 200 | 34 |
| 6-C | | | 208 | 275 | 46 |

The multi-modal resins shown as Runs 1-A, 2-B, 4-A, and 5-B were made by making a dry blend of a low Mw resin 12 with a high Mw resin 14 in the proportions shown in Table 1. The resins 12, 14 were discussed above with respect to FIG. 1

The dry blend was fed into the feed throat 68 of a twin screw extruder 56, model ZSK-58 from Coperion Werner and Pfleiderer, Inc., as generally discussed with respect to FIG. 5, above. The screw of the model ZSK-58 has a diameter of approximately 58 mm and a length of approximately 1200 mm. The extruder and die temperatures were maintained as shown in Table 2. The screw speed and production rates were maintained at the speeds shown in Table 1. Strands of the resin were extruded from the die face into an underwater pelletizer and then transferred using tempered water to a spin dryer and classifier to form pellets of the multi-modal resin.

TABLE 2

Typical set points (° C.) for the various zones on the ZSK-58 extruder.

| Barrel 2 | Barrel 3 | Barrel 4 | Barrel 5 | Throttle Valve | Diverter Valve | Gear Pump | Adapter | Die Plate |
|---|---|---|---|---|---|---|---|---|
| 204 | 232 | 232 | 230 | 230 | 230 | 230 | 230 | 230 |

The number of defects was measured by extruding cast films from the pellets of the multi-modal resins, then processing the films in an optical gel counter. The cast films were all made on a single-screw extruder (Killion Model KL-125) fitted with a standard barrier screw design with a Maddock mixing section at the end. An eight inch wide cast film die with a coathanger design was fitted at the end of the extruder through an appropriate adapter. The cast film die gap was 0.020 inches (0.5 mm). The extruder and die temperatures were maintained at 220° C. The screw speed was maintained at 20 RPM. The melt as it exited the die (vertically downward) was quenched using a pair of high velocity air-knives. The film subsequent to crystallization and solidification was taken up through a pair of primary and secondary rollers, passed through the gel counter and then onto a film winder. Take up speed was adjusted such that the film was nominally 25 micron (1 mil) thick. The gel counter is made by Optical Control Systems (OCS, Model FS-5 camera).

The results obtained from these tests, as shown in Table 1, indicate that the number of defects formed in blends made using the new extruder screw 22 were substantially lower than those obtained using the standard screw configuration. For example, as illustrated by the comparison between runs 1-A and 4-A, a multi-modal resin containing 54% by weight high Mw resin 14 and 46% by weight low Mw resin 12 showed a decrease in defects of about 30% when made using the extruder screw 22 of the present techniques. In the comparison of runs 2-B and 5-B, a resin having 54% by weight low Mw 12 resin also showed a decrease in defects of about 50% when made using the new extruder screw 22. The differences were even more substantial for another series reactor of multi-modal resin, as shown by the comparison of runs 3-C and 6-C. For this resin, the defects were decreased by about 69% when processed on the extruder screw 22 of the present techniques.

While the techniques disclosed above may be susceptible to various modifications and alternative forms, specific embodiments have been shown by way of example in the drawings. However, it should be understood that the techniques are not intended to be limited to the particular forms disclosed. Rather, the techniques encompass all modifications, equivalents and alternatives falling within the spirit and scope of the techniques as defined by the following appended claims.

What is claimed is:

1. A manufacturing system for producing a polyolefin, comprising:
    a reactor system comprising a polymerization reactor, wherein the reactor system is configured to produce two or more polyolefin polymers; and
    an extruder comprising a screw having a feed zone and a high shear melting and mixing zone downstream from the feed zone, the high shear melting and mixing zone starting a distance from an entry point of the screw corresponding to 35% -50% of the overall screw L/D, wherein the screw is configured to blend the two or more polyolefin polymers, and wherein the screw comprises segments configured to increase a degree of fill in the high shear melting and mixing zone, and the segments comprise a backward conveying segment having a screw turn direction that is substantially opposite a screw turn direction of the feed zone, a 3-lobe kneading block segment positioned immediately adjacent and downstream of the feed zone, a neutral kneading block segment positioned downstream of the 3-lobe kneading block segment, and a 2-lobe right hand kneading block segment positioned downstream of the neutral kneading block segment.

2. The manufacturing system of claim 1, wherein the extruder comprises a twin-screw extruder unit configured to blend the two or more polyolefin polymers in a residence time of less than about two minutes in the extruder.

3. The manufacturing system of claim 1, comprising a pelletizer configured to form pellets from a melt discharged from the extruder.

4. The manufacturing system of claim 1, wherein the reactor system is configured to produce the two or more polyolefin polymers as a reactor mixture or a physical mixture.

5. The manufacturing system of claim 1, comprising a feed system for the polymerization reactor, wherein the feed system is configured to store reagents, purify reagents, or deliver reagents to the polymerization reactor, or any combination thereof.

6. The manufacturing system of claim 1, wherein the reactor system comprises two or more polymerization reactors in series.

7. The manufacturing system of claim 1, wherein the polymerization reactor comprises a loop-slurry reactor or a gas-phase reactor.

8. The manufacturing system of claim 1, wherein each of the two or more polyolefin polymers independently comprises a polyethylene homopolymer or a polyethylene copolymer.

9. The manufacturing system of claim 1, comprising a feed system configured to deliver reagents to the reactor system, and the feed system and the reactor system are configured such that the two or more polyolefin polymers comprise a high molecular weight polyolefin having a molecular weight range from about 200,000 to about 700,000 g/mol weight-average molecular weight.

10. The manufacturing system of claim 9, wherein the feed system and the reactor system are configured such that the high molecular weight polyolefin comprises from about 45% by weight to about 70% by weight of the two or more polyolefin polymers.

11. The manufacturing system of claim 10, wherein the two or more polyolefin polymers comprise a low molecular weight polyolefin having an average molecular weight range from about 20,000 to about 100,000 g/mol weight-average molecular weight.

12. The manufacturing system of claim 11, wherein the feed system and the reactor system are configured such that the low molecular weight polyolefin comprises from about 30% by weight to about 55% by weight of the two or more polyolefin polymers.

13. The manufacturing system of claim 1, wherein the backward conveying segment is positioned downstream of the 2-lobe right hand kneading block segment.

14. The manufacturing system of claim 13, wherein the mixing zone is positioned downstream of the backward conveying segment.

15. The manufacturing system of claim 14, comprising a metering zone positioned downstream of the mixing zone.

16. The manufacturing system of claim 1, comprising the two or more polyolefin polymers disposed within the extruder and interacting with the screw, wherein the two or more polyolefin polymers comprise a lowest molecular weight polyolefin and a highest molecular weight polyolefin of the two or more polyolefin polymers, and the difference between the highest molecular weight polyolefin and the lowest molecular weight polyolefin is greater than about 200,000 in weight average molecular weight, the two or more polyolefin polymers being present as a multimodal blend, and wherein the multimodal blend has less than about 90 defects/ft$^2$ in a size range of about 250 to 800 microns.

17. A method for blending polymers, comprising:
    providing two or more polyolefin polymers with a polymerization reactor of a reactor system, the two or more polyolefin polymers having a lowest molecular weight polyolefin and a highest molecular weight polyolefin; and
    combining the two or more polyolefin polymers by passing the two or more polyolefin polymers through an extruder to form a multi-modal polyolefin resin, wherein the extruder comprises a screw having a feed zone, a high shear melting and mixing zone downstream from the feed zone, and a metering zone downstream from the high shear melting and mixing zone, the high shear melting and mixing zone starting a distance from an entry point of the screw corresponding to 35%-50% of the overall screw L/D, and wherein the screw comprises segments configured to increase a degree of fill in the high shear melting and mixing zone, and the segments comprise a backward conveying segment having a screw turn direction that is substantially opposite a screw turn direction of the feed zone, a 3-lobe kneading block segment positioned immediately adjacent and downstream of the feed zone, a neutral kneading block segment positioned downstream of the 3-lobe kneading block segment, and a 2-lobe right hand kneading block segment positioned downstream of the neutral kneading block segment, wherein the backward conveying segment is positioned downstream of the 2-lobe right hand kneading block segment and the mixing zone is positioned downstream of the backward conveying segment.

18. The method of claim 17, comprising blending the two or more polyolefin polymers in the extruder via a single extrusion step in a residence time of less than about two minutes in the extruder.

19. The method of claim 17, comprising a feed system configured to deliver reagents to the reactor system, and the feed system and the reactor system are configured such that the highest molecular weight polyolefin has a molecular weight range from about 200,000 to about 700,000 g/mol weight-average molecular weight.

20. The method of claim 19, wherein the feed system and the reactor system are configured such that the high molecular weight polyolefin comprises about 45% by weight to 70% by weight of the two or more polyolefin polymers.

21. The method of claim 20, wherein the lowest molecular weight polyolefin has a molecular weight range from about 20,000 to about 100,000 g/mol weight-average molecular weight.

22. The method of claim 21, wherein the feed system and the reactor system are configured such that the low molecular weight polyolefin comprises about 30% by weight to 55% by weight of the two or more polyolefin polymers.

23. The method of claim 17, wherein the difference between the highest molecular weight polyolefin and the lowest molecular weight polyolefin is greater than about 200,000 in weight average molecular weight, and wherein the multi-modal polyolefin resin has less than about 90 defects/ft$^2$ in a size range of about 250 to 800 microns.

* * * * *